United States Patent [19]
Kobayashi et al.

[11] Patent Number: 5,582,356
[45] Date of Patent: Dec. 10, 1996

[54] LOCKING MEMBER FOR SECURING A ROTOR WITHIN A FISHING REEL ASSEMBLY

[75] Inventors: Mikiharu Kobayashi; Nobuyuki Yamaguchi, both of Tokyo, Japan

[73] Assignee: Daiwa Seiko, Inc., Tokyo, Japan

[21] Appl. No.: 521,853

[22] Filed: Sep. 5, 1995

Related U.S. Application Data

[63] Continuation of Ser. No. 154,476, Nov. 19, 1993, abandoned.

[30] Foreign Application Priority Data

Nov. 25, 1992 [JP] Japan ................................ 4-086605 U

[51] Int. Cl.$^6$ ...................................................... A01K 89/00
[52] U.S. Cl. ......................... 242/230; 242/283; 403/320; 411/120
[58] Field of Search ...................................... 242/230, 231, 242/232, 233, 283, 322; 403/348, 342, 320, 319; 411/116, 120, 121

[56] References Cited

U.S. PATENT DOCUMENTS 4,196,869 4/1980 Shepherd ................................ 242/230

FOREIGN PATENT DOCUMENTS 57-171415 10/1982 Japan .
63-38772 3/1988 Japan .

Primary Examiner—Daniel P. Stodola
Attorney, Agent, or Firm—Longacre & White

[57] ABSTRACT

In a fishing reel in which a rotor is fixed onto a rotary quill with a nut, a securing member is non-rotatively fitted on the nut in such a manner that an engagement portion of the securing member is engaged with a projection formed on the rotor, in order to prevent the nut from rotating relative to the rotor. It is possible to prevent the nut from loosening from the rotary quill.

2 Claims, 7 Drawing Sheets

5,582,356

LOCKING MEMBER FOR SECURING A ROTOR WITHIN A FISHING REEL ASSEMBLY

This is a continuation of application Ser. No. 08/154,476 filed Nov. 19, 1993, which was abandoned upon the filed hereof.

BACKGROUND OF THE INVENTION

1. Field of the Invention

The present invention related to a fishing reel in which a rotary member is fastened and fixed by means of a threadingly engaging member to a drive shaft of a fishing line take-up drive mechanism for winding a fishing line around a spool in such a manner that the rotary member is to be rotated together with the drive shaft and, in particular, to a loosening preventive structure of the threadingly engaging member. No special limit is given to the type of reels and thus the invention can apply to a spinning reel, a double bearing type reel, and other types of reels.

2. Description of the Prior Art

Japanese Utility Model Publication Nos. Sho. 57-171415 and Sho. 63-38772 disclose a fishing reel in which a rotary member is fixed on a drive shaft of a fishline taking-up mechanism with a threading member so as to rotate together with the drive shaft, and further a retaining member is provided for preventing the threading member from loosening. However, the retaining member is fixed to the rotary member with screws.

More specifically, in Japanese Utility Model Publication No. 57-171415, there are disclosed two structures: in one structure, a rotor is fastened to a rotary quill of a spinning reel by means of a nut, a rotation preventive piece is secured to the nut in order to prevent the nut from loosening, and the rotation preventive piece is fixed to the wall of the rotor by a screw; and, in the other structure, a handle arm of a double bearing type reel is fastened and fixed to a rotary shaft by means of a bolt, a rotation preventive piece is secured to the bolt in order to prevent the bolt from loosening, and the rotation preventive piece is fixed to the handle arm by means of a screw.

In Japanese Utility Model Publication No. 63-38772, there is disclosed a structure in which a rotor is fastened to a rotary quill of a spinning reel by means of a nut, and, in order to prevent the nut from loosening, the nut is secured by means of a polygonal hole formed in a line drop preventive ring and the line drop preventive ring is fixed to the wall of the rotor.

In the above-mentioned conventional structures, as described above, a screw is necessary in order to fix the rotation preventive piece and, on the screw fixing side of the structure, it is necessary to form a screw hole. However, the above-mentioned rotor or handle arm is thin in thickness and is thus not sufficient to form the screw hole and, for this reason, there is a possibility that the thread of a screw formed therein can be broken off. Also, the operationability of assembling the reel is worsened because a small screw must be handled and, what is worse, the screw can be lost.

SUMMARY OF THE INVENTION

Accordingly, it is an object of the invention to provide a fishing reel having a structure which is highly reliable and can prevent loosening of a threadingly engaging member for fastening and fixing a rotary member of the reel to a drive shale of a fishing line take-up drive mechanism to take up a fishing line, with a good operationability and easy assembly.

In order to attain the above-noted and other objects, according to the invention, there is provided a fishing reel in which a rotary member is fastened and limed by means of a threadingly engaging member to a drive shaft of a fishing line take-up drive mechanism for up a fishing line around a spool in such a manner that the rotary member is rotated together with the drive shaft. In particular, there is provided a securing member having a first engagement portion engageable with the threadingly engaging member in the rotationally circumferential directions of the drive shaft and the securing member further includes a second engagement portion engageable with a securing portion formed integrally with the rotary member.

According to the invention, due to the fact that the second engagement portion of the securing member engaged with the threadingly engaging member through the first engagement portion of the securing member in the rotationally circumferential directions of the drive shaft are engaged with the securing portion formed integrally with the rotary member, the need to provide a screw between the securing member and rotary member is eliminated to thereby improve the efficiency of the reel assembling operation. Moreover, there is no need to form a screw hole for such screw, whereby a highly reliable fishing reel can be realized.

DETAILED DESCRIPTION OF PREFERRED EMBODIMENTS

Figure 1:
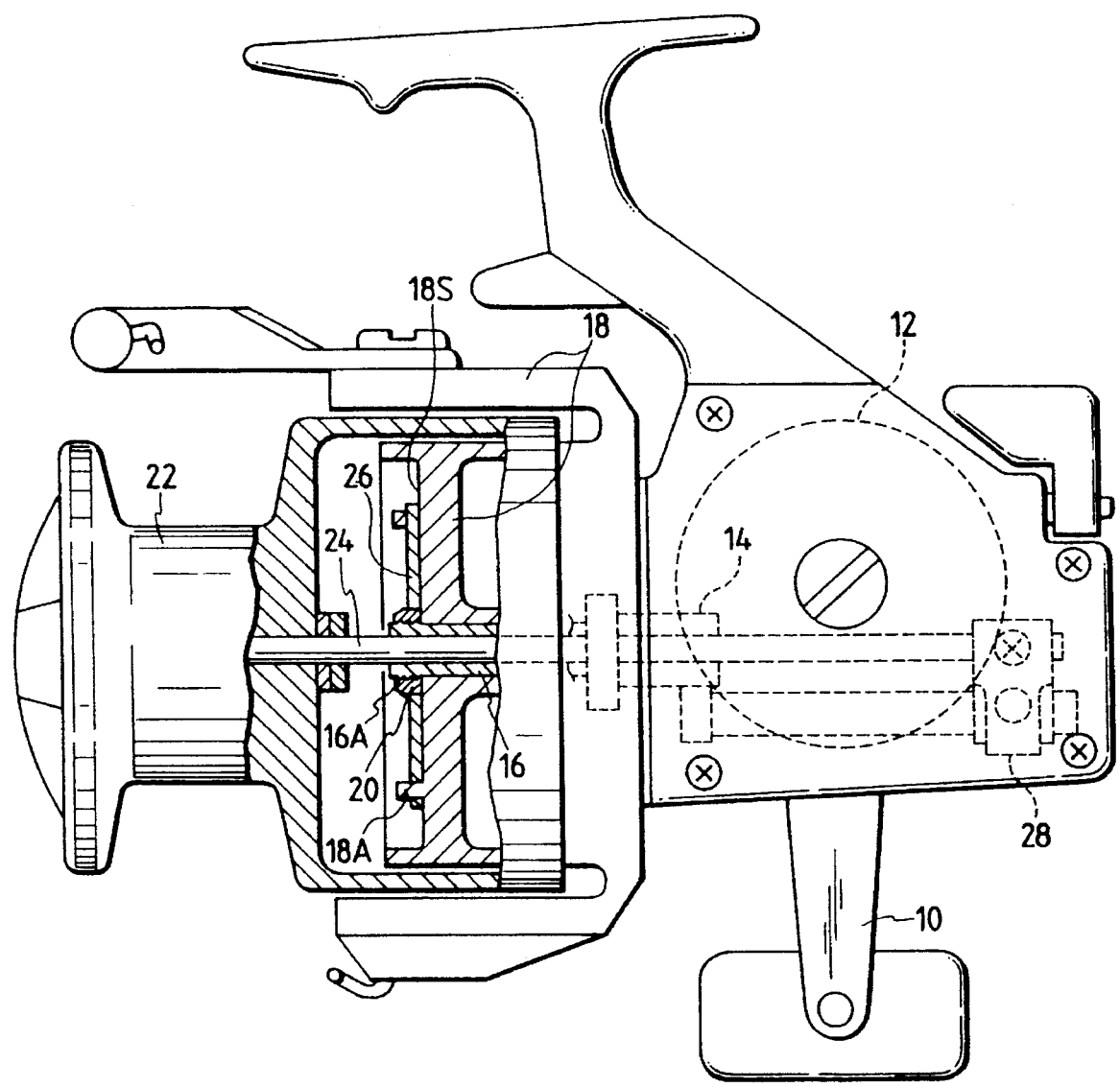
FIG. 1 is a partially broken side view of a first embodiment of a fishing reel according to the invention.
Figure 2:
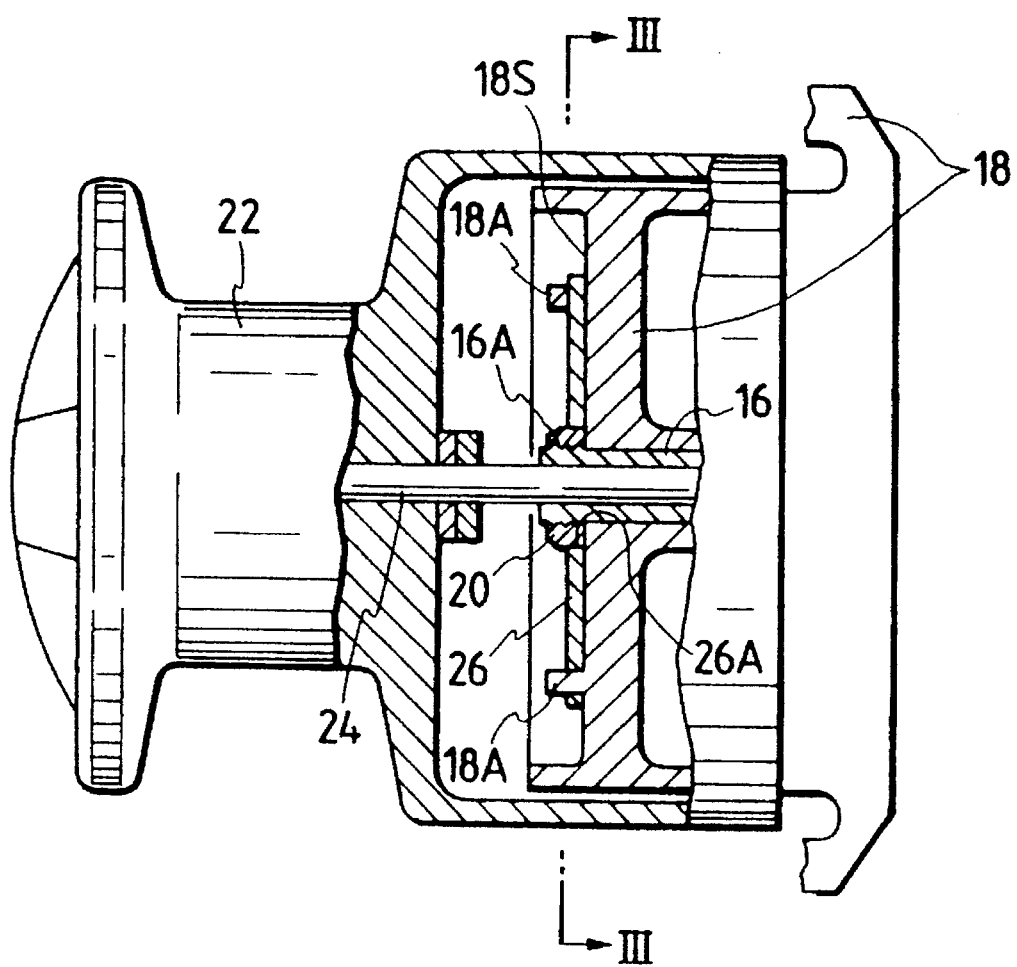
FIG 2 is a partially broken view of the enlarged main portions of the reel shown in FIG. 1.

Now, description will be given hereinbelow in more detail of the invention by way of the embodiments thereof respectively shown in the accompanying drawings.

In FIGS. 1 to 5, there is shown a spinning reel for fishing according to a first embodiment of the invention. A handle 10 is rotated to thereby cause a drive gear 12 to rotate, and the rotational movement thereof is transmitted to a pinion 14 to thereby rotate a rotary quill or tubular drive shaft 16 which is formed integrally with the pinion 14. The drive shaft 16 includes a thread 16A in the outer periphery of the leading portion thereof. A rotor (a rotary member) 18 is fastened and fixed to the drive shaft 16 through a nut 20 which is threadingly engageable with the thread 16A.

On the other hand, a spool shaft 24 is inserted through the pinion 14 and drive shaft 16 and can be moved back and forth by means of a well known slide mechanism 28. Since the spool shaft 24 is fastened integrally to a spool 22, with the rotor 18 rotating, the spool 22 is moved back and forth, so that a fishing line can be wound up around the spool 22.

Figure 3:
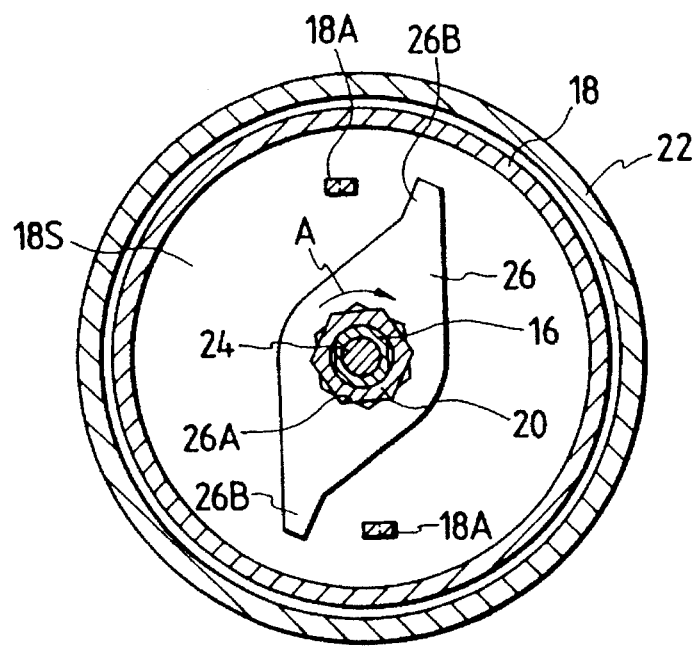
FIG. 3 corresponds to a transverse section view taken along the arrow line III—III shown in FIG. 2, explaining assembly of the reel in combination with FIG. 4.
Figure 4:
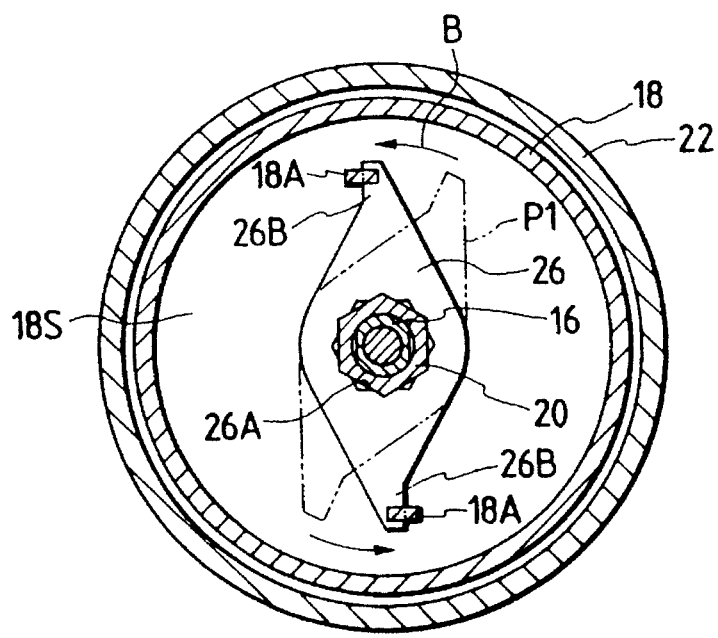
FIG. 4 is a transverse section view taken along the same section as FIG. 3, and further explaining the assembly of the reel.
Figure 5:
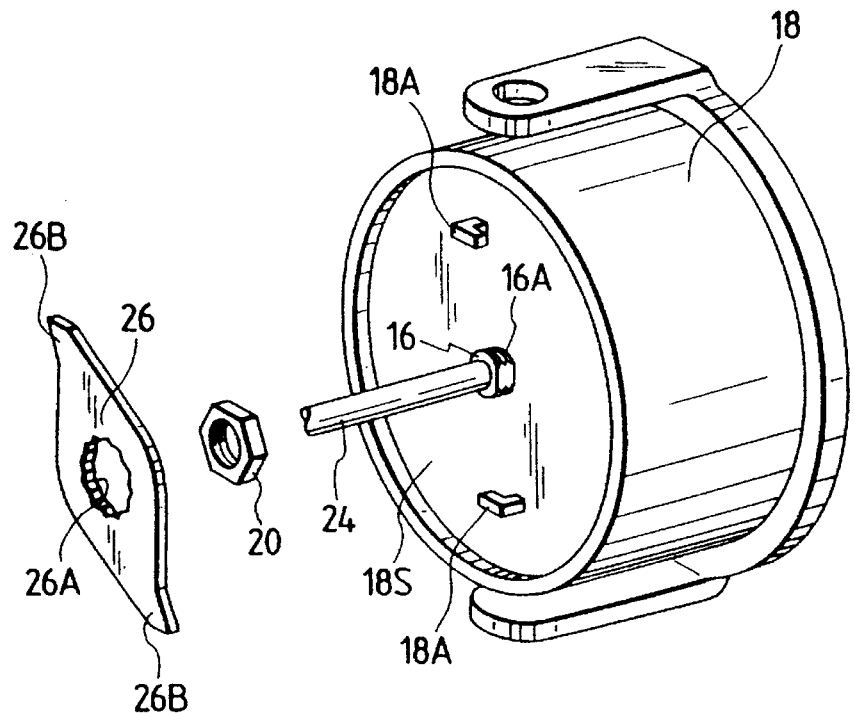
FIG. 5 is an exploded perspective view of the first embodiment shown in FIG. 2.

The nut 20, which is used to fasten and fix the drive shaft 16 and rotor 18 to each other, normally loosens gradually in the aforementioned prior art mechanisms. In order to prevent such loosening, a securing member 26, which is engageable with two securing portions 18A each projectingly formed on a leading surface 18S of the rotor 18, is engages with the nut 20 as best shown in FIGS. 3 and 4. That is, the plate-shaped securing member 26 includes in the center portion thereof an engagement hole 26A serving as a first engagement portion engageable with projections or corners respectively provided in the outer periphery of the nut 20 and also includes in the tip end portions thereof two engagement portions 26B respectively serving as second engagement portions. The two engagement portions 26B are engageable with the securing portions 18A, respectively.

A manner of assembling the securing member 26 to the nut 2 and rotor 18 is as follows: First, the nut 20 is rotated in a direction of an arrow A (FIG. 3) by a given fastening torque. Then, the securing member 26 is fitted on the nut 20 so as to be located at a position shown by a solid line in FIG. 3 or a position P1 shown in FIG. 4. Finally, the securing member 26 is rotated in a direction of an arrow B, in which direction the fastening force of the nut 20 is slightly loosened, until the engagement portions 26B provided on the two end portions of the securing member 26 are engaged with the securing portion 18A of the rotor 18.

In general, the rotor 18 is threadingly fixed to the drive shaft 16 by the nut 20 and, if the rotor 18 winds and guides a fishing line around the spool 22 when the fishing line is taken up, then irregular loads in the rotational direction or in the back-and-forth direction act especially on the threadingly fixed portion between the rotor 18 and the drive shaft 16. At the same time, when the fishing line is drawn out, the threadingly fixed portion of the rotor 18 receives shocks produced by a well-known reversal preventive device as it prevents the rotor 18 from rotating in the reversed direction. Therefore, according to the conventional structures, there is a possibility that the nut 20 can be loosened. However, according to the invention, due to the fact that the engagement portions 26B of the securing member 26 engaged with the nut 20 through the engagement hole 26A are engaged with the securing portion 18A of the rotor 18, the loosening of the nut 20 can be surely prevented. That is to say, the securing member 26 can surely prevent the undesirable rotation of the nut 20 relative to the rotor 18.

As described above, according to the invention, the securing member 26 can be fixed to the rotor 18 simply by securing the securing member 26 to the securing portion 18A which is injection formed of the same material as the rotor 18 such as nylon or the like integrally with the rotor 18. Due to this, the present invention is excellent in the assembling operationability thereof, eliminates the need for provision of a screw hole for a screw and small parts, and is thus highly reliable. Also, the securing member 26 can be produced by punching a plate which is formed of aluminum or the like.

Figure 6:
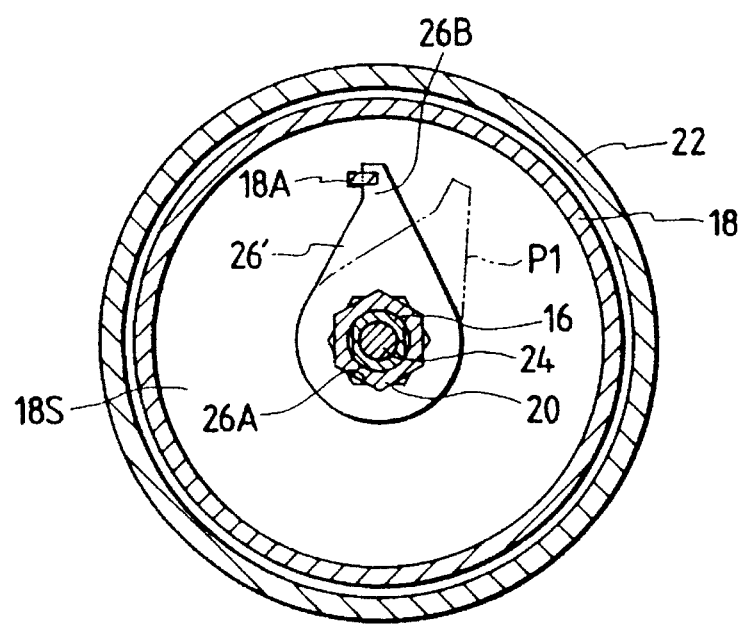
FIG. 6 is a transverse section view of a second embodiment of a fishing reel according to the invention, corresponding to FIG. 4.

Next, in FIG. 6, there is shown a fishing reel according to a second embodiment of the invention. The second embodiment is different from the first embodiment in that a single securing portion 18A is provided, and accordingly a single engagement portion 26B is provided in a securing member 26'. However, the other portions of the second embodiment are the same as the first embodiment.

Figure 7:
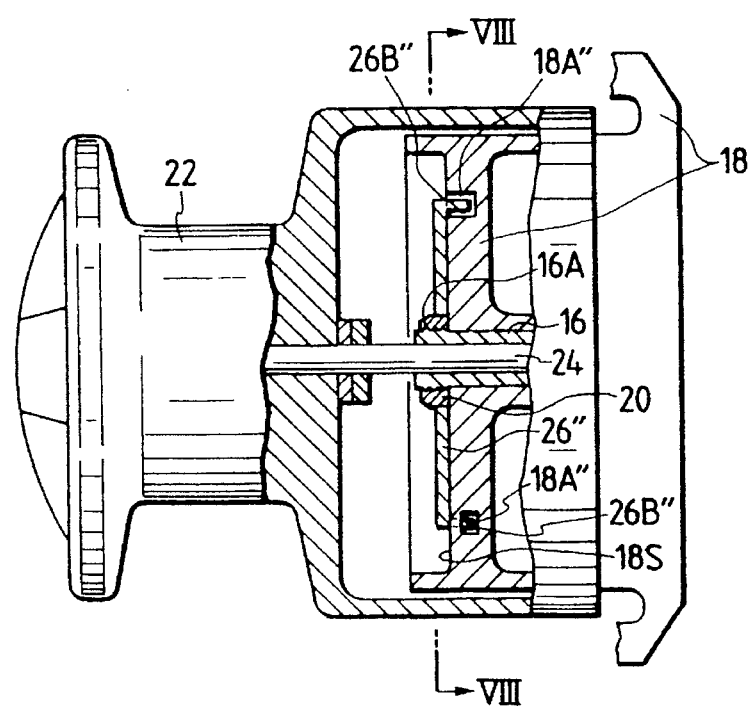
FIG. 7 is a partially broken side view of a third embodiment of a fishing reel according to the invention, corresponding to FIG. 2.
Figure 8:
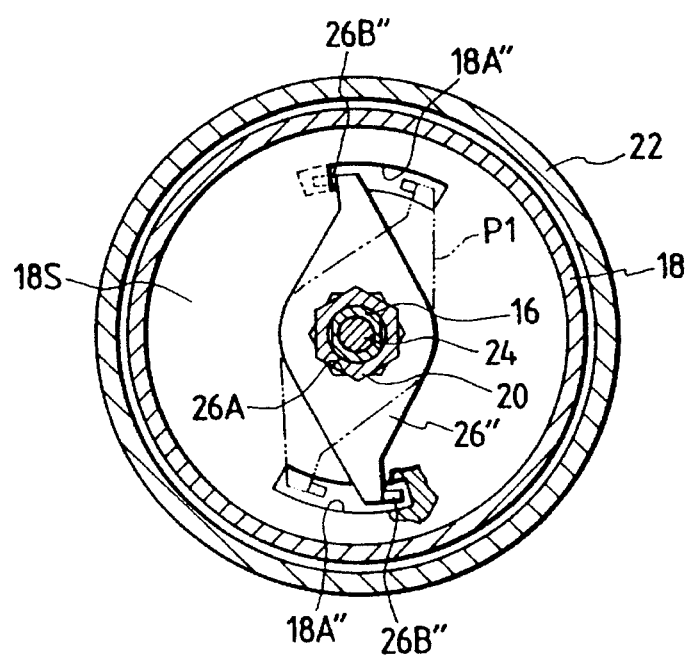
FIG. 8 is a transverse section view taken along the arrow line VIII—VIII shown in FIG. 7.

In FIGS. 7 and 8, there is shown a fishing reel according to a third embodiment of the invention. The third embodiment is different from the first embodiment in that the securing portions 18A provided projectingly on the leading surface 18S of the rotor 18 are formed as recesses 18A", and the engagement portions 26B" of a securing member 26" to be engaged with the recessee 18A" are formed bent with respect to the surface of the securing member 26". However, the other portions of the third embodiment are similar to the first embodiment.

Figure 9:
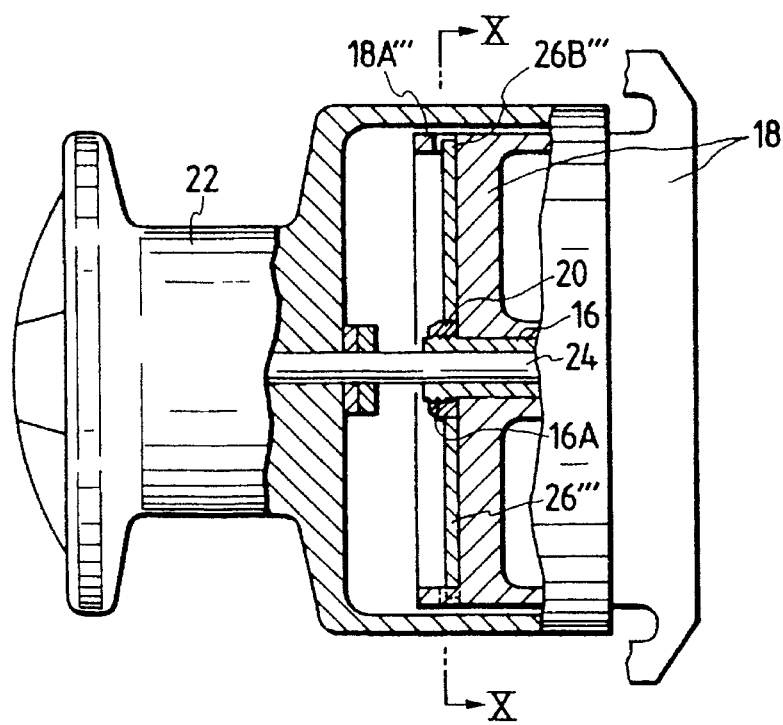
FIG. 9 is a partially broken view of a fourth embodiment of a fishing reel according to the invention, corresponding to FIG. 2.
Figure 10:
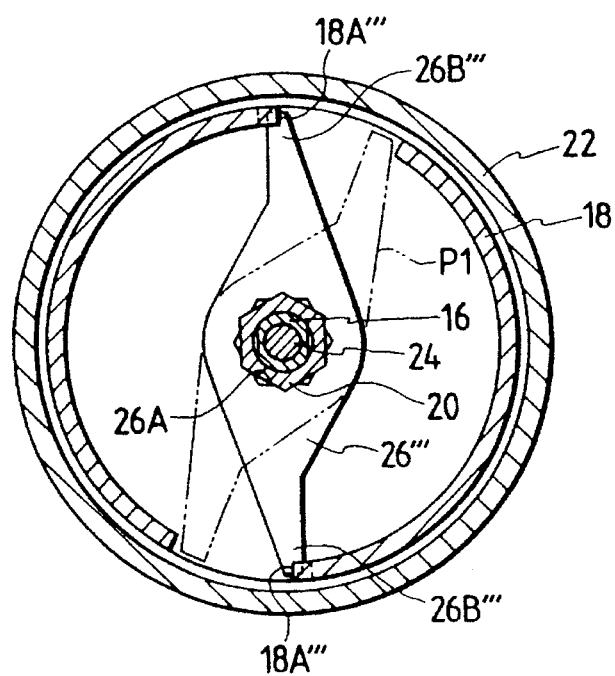
FIG. 10 is a transverse section view taken along the arrow line X—X shown in FIG. 9.

Further, in FIGS. 9 and 10, there is shown a fishing reel according to a fourth embodiment of the invention. The fourth embodiment is different from the first embodiment in that the securing portions 18A provided projectingly on the lead surface 18S of the rotor 18 are formed as cutaway portions 18A'''. The cutaway portions 18A''' are formed by cutting away part of the peripheral edge wall of the rotor 18, and a securing member 26''' having engagement portions 26B''' to be engaged with the cutaway portions 18A''' is formed a little longer. However, the other portions of the fourth embodiment are similar to the first embodiment.

Figure 11:
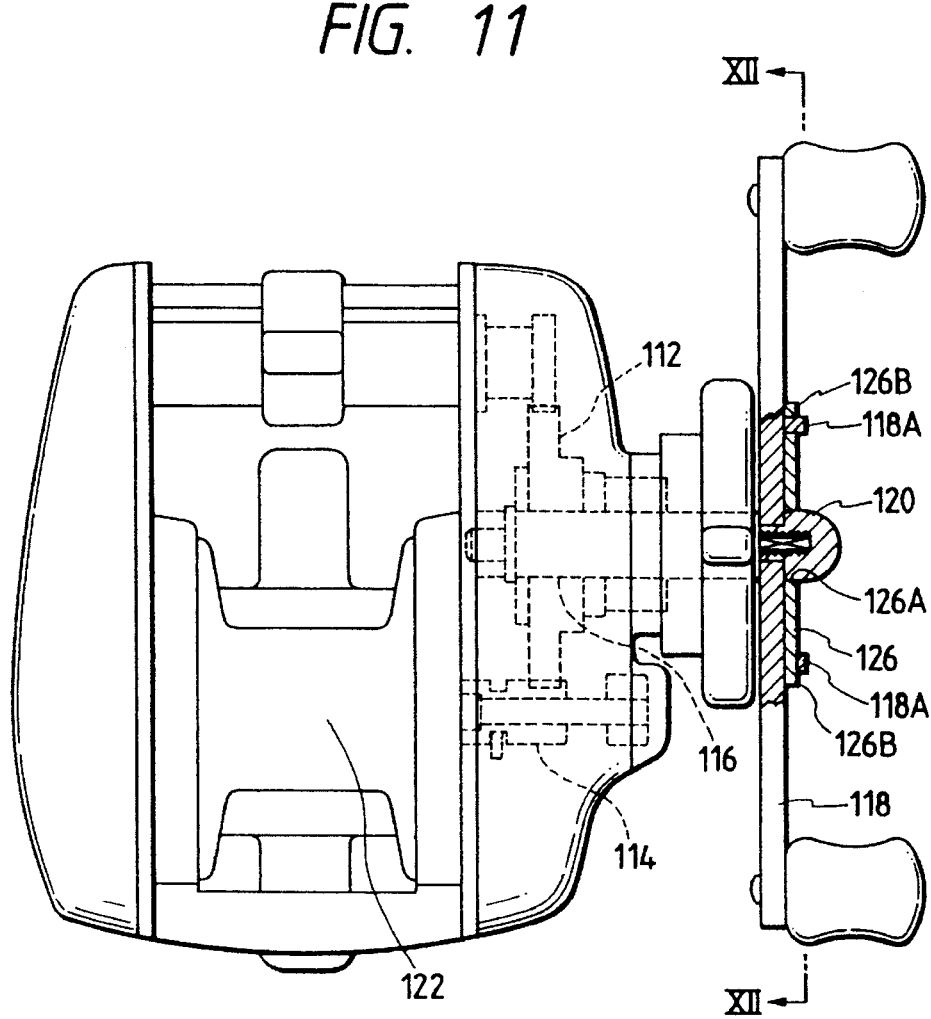
FIG. 11 is a partially broken plan view of a fifth embodiment of a fishing reel according to the invention; and, FIG. 12 is a transverse section view taken along the arrow line XII—XII shown in FIG. 11.
Figure 12:
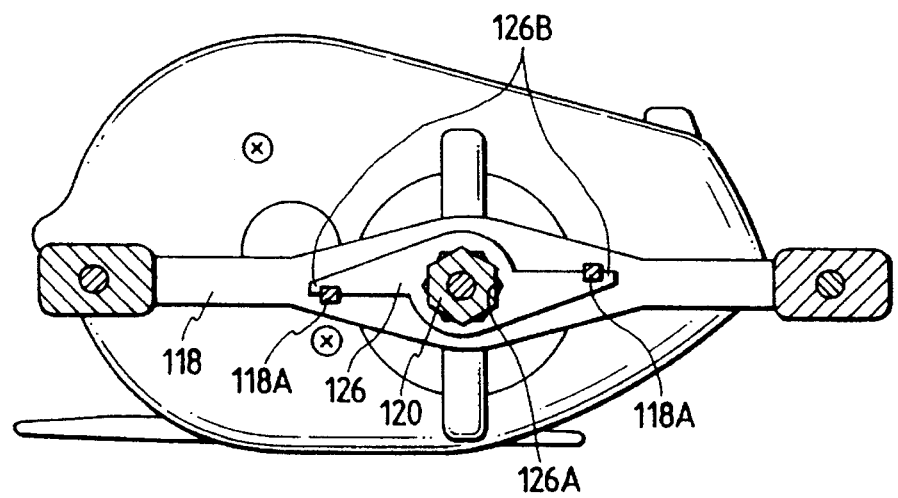

Moreover, in FIGS. 11 and 12, there is shown a fishing reel according to a fifth embodiment of the invention. The present reel is a double bearing type reel different as opposed to the previous reels. A handle arm 118 is fastened and fixed to a drive shaft 116 by a nut 120, and a drive gear 112 is mounted on the other end of the drive shaft 116 in such a manner that it can be rotated integrally with drive shaft 116. The drive gear 112 is in mesh with a pinion 114 to rotate a spool 122 through the pinion 114. As a result of this, a fishing line can be wound around the spool 122.

In the reel of this type, in order to prevent loosening of the nut 120 which is used to fasten and fix the handle arm 118 serving as a rotary member rotatable together with the drive shaft 116, there is used a securing member 126 which has an engagement hole 126A engageable with the outer peripheral portions of the nut 120. That is, the handle arm 188 includes on the surface thereof two projections-like securing portions 118A, whereby two engagement portions 126B respectively formed at the two end portions of the securing member 126 can be engaged with the securing portions 118A respectively to prevent the nut 120 from loosening.

As had been described in the case of the spinning reel, various modifications of the shapes of the securing portions 118A and securing member 126 are possible. Also, the present invention can also apply to other kinds of reels. Further, the threadingly engaging member is not limited to the nut but a bolt can also be employed in the invention.

As can be clearly understood from the foregoing description, according to the invention, because a small part such as a screw or the like is not used, the loosening prevention of the threadingly engaging member used to fasten and fix the rotary member of the reel to the drive shaft of the fishing line take-up drive mechanism for taking up a fishing line can be achieved with a good operationability and also eliminates the need to form a screw hole, so that a fishing reel having a highly reliable structure can be supplied.

What is claimed is:

1. A fishing reel in which a rotary member is fastened and fixed by a threadingly engaging member to a drive shaft of a fishing line take-up drive mechanism for taking up a fishing line around a spool which reciprocates along an axis of said drive shaft in such a manner that the rotary member can be rotated together with the drive shaft, said fishing reel comprising a substantially planar securing member interposed between said rotary member and said spool, and including a first engagement portion engageable with said threadingly engaging member in the rotationally circumferential directions of said drive shaft, said first engagement portion comprising an aperture through which said drive shaft is adapted to pass, and said securing member further including a second engagement portion engageable with a corresponding securing portion formed integrally with said rotary member, wherein said rotary member comprises an abutment surface against which said threadingly engaging member abuts, and a circumferential flange extending substantially around the circumference of said abutment surface and being aligned with a radially outermost edge of said rotary member, said circumferential flange and said abutment surface defining a recessed portion in said rotary member, and wherein said substantially planar securing member is received in said recessed portion between said rotary member and said spool and adjacent said abutment surface in order that said securing member does not interfere with the reciprocating motion of said spool with respect to said rotary member, said corresponding securing portion formed integrally with said rotary member comprises a notch provided in said circumferential flange, said notch receiving said second engagement portion therein to limit a rotational movement of said securing member.

2. A fishing reel in which a rotary member is fastened and fixed by a threadingly engaging member to a drive shaft of a fishing line take-up drive mechanism for taking up a fishing line around a spool which reciprocates along an axis of said drive shaft in such a manner that the rotary member can be rotated together with the drive shaft, said fishing reel comprising a substantially planar securing member interposed between said rotary member and said spool, and including a first engagement portion engageable with said threadingly engaging member in the rotationally circumferential directions of said drive shaft, said first engagement portion comprising an aperture through which said drive shaft is adapted to pass, and said securing member further including a second engagement portion engageable with a corresponding securing portion formed integrally with said rotary member, said corresponding securing portion and said rotary member defining a unitary body, wherein said rotary member comprises an abutment surface against which said threadingly engaging member abuts, and a circumferential flange extending substantially around the circumference of said abutment surface and being aligned with a radially outermost edge of said rotary member, said circumferential flange and said abutment surface defining a recessed portion in said rotary member, wherein said substantially planar securing member is received in said recessed portion between said rotary member and said spool and adjacent said abutment surface in order that said securing member does not interfere with the reciprocating motion of said spool with respect to said rotary member, and said second engagement portion of said securing member further comprises two portions formed on respective opposite radial ends of said securing member with respect to said first engagement portion such that said securing member is radially balanced when rotated about said drive shaft with said rotary member and said spool;

each of said two portions of said second engagement portion includes an engagement tang provided at a radial end thereof; and said corresponding securement portion of said rotary member includes at least two delimiting recesses, each recess corresponding to and engaging one of said two tangs.

* * * * *